Dec. 25, 1962     O. C. GESSLER     3,069,720
AUTOMOBILE BODY CLOSURE HINGE
Filed Oct. 3, 1960
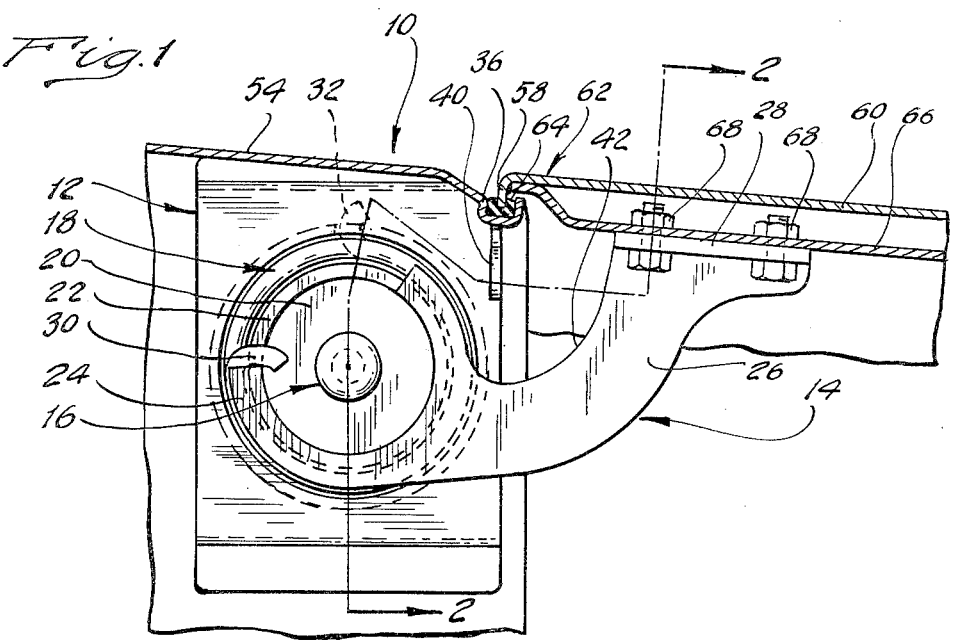
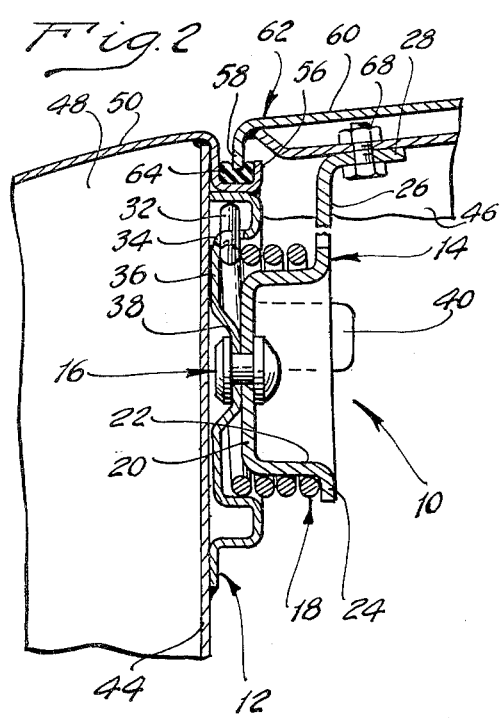
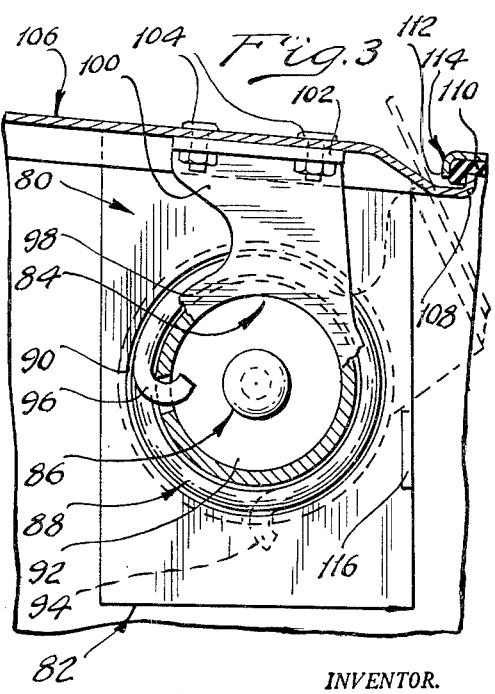
INVENTOR.
OTTO C. GESSLER
BY
Barthel & Bugbee
ATTORNEYS

United States Patent Office 3,069,720
Patented Dec. 25, 1962

3,069,720
AUTOMOBILE BODY CLOSURE HINGE
Otto C. Gessler, 8592 Archdale St., Detroit 28, Mich.
Filed Oct. 3, 1960, Ser. No. 60,155
4 Claims. (Cl. 16—128.1)

This invention relates to automobile body hardware and, in particular, to automobile body closure hinges.

One object of this invention is to provide an automobile body closure hinge which is adapted to be mounted in pairs on the side walls of the trunk or engine compartment of an automobile to hingedly support and to counterbalance the weight of the front or rear deck lid in such a way that the hinge fits compactly against the side walls so as to provide as much unobstructed compartment space as possible and to prevent such interference between the hinge and the contents of the compartment as would cause damage to the said contents or obstruct the operation of the hinge.

Another object is to provide an automobile body closure hinge of the foregoing character wherein the convolutions of the counterbalancing torsion spring are prevented from displacement either axially or radially within the hinge mechanism so that a true application of torque results during operation.

Another object is to provide an automobile body closure hinge which is simple to manufacture and consists of few parts, in one instance consisting of only two stampings, one rivet and the torsion spring.

Other objects and advantages of the invention will become apparent during the course of the following description of the accompanying drawings, wherein:

FIGURE 1 is a side elevation of an automobile body closure hinge, according to one form of the invention, as mounted on the bulkhead between the trunk or engine compartment and the fender space for hingedly supporting one corner of the compartment lid;

FIGURE 2 is a fragmentary vertical section taken along the line 2—2 in FIGURE 1, looking rearwardly; and FIGURE 3 is a side elevation, partly in section, of a modification of the hinge shown in FIGURE 1.

Referring to the drawings in detail, FIGURES 1 and 2 show an automobile body hinge, generally designated 10, as consisting generally of a mounting plate 12, a pivoted spring-retaining lever structure 14, a pivot pin 16 pivotally supporting the spring-retaining lever structure 14 upon the mounting plate 12, and a weight-counterbalancing torsion spring 18. The spring-retaining lever structure 14 includes a perforated cup portion 20 with a cylindrical periphery 22, an arcuate retaining flange 24 at one end of the cylindrical periphery 22, a bent hinge lever arm 26 extending from the flange 24 and a lid-mounting end flange 28 terminating the hinge lever arm 26.

The torsion spring 18 is coiled loosely around the cylindrical portion 22 of the spring-retaining lever structure 14 and has one end 30 hooked against one end of the flange 24 and the other end 32 hooked into a hole 34 in the mounting plate 12. The perforated cup portion 20 is received against the interior surface of a cupped recess 36 of the mounting plate 12 within which portion is a smaller perforated cupped projection 38 which receives the enlarged rearward end portion of the pivot pin 16. The mounting plate 12, for convenience, is preferably stamped from flat sheet metal and includes a stop portion 40 extending from the edge thereof and intercepting the top edge 42 of the hinge lever arm portion 26 during the swinging motion thereof.

The mounting plate 12 is bolted, welded or otherwise secured to the bulkhead 44 (FIGURE 2) separating the trunk compartment 46 from the space 48 beneath the fender 50 which covers the wheel (not shown). The fender 50 and the fixed rear deck portion 54 (FIGURE 1) terminate in a drip channel portion 56 which receives the downturned edge portion 58 of the upper panel 60 of the trunk lid, generally designated 62, against the resilient sealing gasket 64. Spaced apart from the upper trunk lid panel 60 is a lower trunk lid panel 66 which is secured by bolts 68 to the end flange 28 upon the lever arm portion 26.

In the assembly of the hinge 10 of the present invention, the torsion spring 18 is placed in the recessed portion 36 of the mounting plate 12 and its end 32 is hooked into the hole 34. The spring-retaining lever structure 14 is then moved into position and the other end 30 of the torsion spring 18 is hooked against one end of the arcuate retaining flange 24. A temporary elongated pivot pin (not shown) is inserted in the position to be later occupied by the permanent pivot pin 16. The spring-retained lever structure 14 is then rotated in a clockwise direction relative to the plate 12 (FIGURE 1) to apply tension to the torsion spring 18. During this process, the structure 14 is pulled outward from the plate 12 along the axis of the temporary pivot pin to pass clear of the stop portion 40 and then is pushed back against the mounting plate 12.

The spring-retaining lever structure 14 is now restrained against further motion relative to the plate 12, both along the axis of the temporary pivot pin wherein a suitable clamp or fixture (not shown) provides such restraint, and in a rotational manner wherein the stop portion 40 prevents unwinding of the lever structure 14 and spring 18. The temporary pivot pin is now withdrawn and replaced by the permanent pivot pin 16, and the clamp or fixture is removed.

In the installation of the hinge 10 in an automobile body, the mounting plate 12 is welded, bolted, or otherwise attached to the bulkhead 44 in its desired position. The lid mounting end flange 28 of the lever structure 14 is then bolted or otherwise secured at 68 to the lid 62.

In the operation of the invention, when the operator pulls downward and secures the lid 62 in its closed position, the spring-retaining lever structure 14 swings in a clockwise direction around its pivot pin 16 (FIGURE 1) so as to follow the motion of the lid 62. As this occurs, the retaining flange 24 in rotating pulls with it the end portion 30 of the torsion spring 18, thereby circumferentially applying and maintaining tension in the torsion spring 18. When the operator releases the lid 62 from its closed position, the torsion spring 18 unwinds so as to resume its original condition wherein the stop portion 40 prevents further unwinding. The released tension of the torsion spring 18 applied by the end 30 thereof against the retaining flange 24 swings the spring-retaining lever structure 14 and the lid 62 in a counterclockwise direction. Accordingly, the tension applied to the torsion spring 18 not only counterbalances the weight of the lid 62 but raises the lid 62 sufficiently for the operator to grasp the other end thereof and raise it to its fully open position. The retaining flange 24 and the cylindrical periphery 22 of the cup portion 20, together with the adjoining cupped recess 36 of the mounting plate 12, restrain the convolutions of the torsion spring 18 from either radial or axial displacement. At the same time, the spring-retaining lever structure 14 serves also to shield objects in the trunk compartment 46 from catching in the convolutions of the torsion spring 20.

The modified hinge, generally designated 80, shown in FIGURE 3, is well adapted for pivotally supporting the lids of automobile engine or trunk compartments having insufficient surface on their side bulkheads for establishing the pivotal hinge support beneath the fixed deck portion of the compartment. The automobile body hinge 80 consists generally of a mounting plate 82, a spring-retaining lever structure 84, a pivot pin 86 pivotally securing the lever structure 84 to the plate 82, and a torsion spring 88. The mounting plate has a cup-shaped recess 90 against which is disposed a cup-shaped portion 92 of the lever structure 84. The torsion spring 88 is coiled loosely around the cup-shaped portion 92 and has convolutions proceeding in counterclockwise direction (FIGURE 3) from its end 94 hooked into the mounting plate 82 to its end 96 hooked into the cup-shaped portion 92.

The spring-retaining lever structure 84 has, in addition to the cup-shaped portion 92, an annular retaining flange 98 thereupon and a hinge lever arm portion 100 extending approximately upward (FIGURE 3) from the flange 98 and terminating in a lid mounting end flange 102. The lid-mounting end flange 102 is secured by bolts 104 to the compartment lid, generally designated 106. The lid 106 terminates in a channel portion 108 which meets a resilient sealing gasket 110 attached to the under side of the downturned edge 112 of the fixed rear deck, generally designated 114. A stop portion 116 of the mounting plate 82 intercepts the path of the hinge lever arm 100.

The assembly and operation of the modified hinge 80 closely resembles those of the hinge 10 except that as the operator releases the lid from its closed position and the torsion spring 88 raises the lid 106 by means of the spring-retaining lever structure 84, the right-hand end (FIGURE 3) of the lid 106, including the channel portion 108, moves downward and to the right in a rotary manner.

While FIGURE 2 of the drawing shows the mounting plate 12 welded to and against a bulkhead or wall 44, it will be evident that the mounting plate 12 may with equal convenience be welded at its upper and lower edges in a conventional manner to the rear deck and top wall of the wheel housing respectively. In such an installation, the mounting plate 12 is conveniently made flat, as in the case of the mounting plate 82 in FIGURE 3, with the bottom wall of the cup portion 20 flat against the flat mounting plate 12 without the need for the cupped projection 38 for the pivot pin 16. In such an arrangement, the other end 32 of the torsion spring 18 is hooked sidewise into the hole 34 in the flat mounting plate 12. The location of the welds in the mounting plate 12 obviously depends upon the particular installation and the convenience of attachment of the mounting plate to the particular body structure available. The end 30 of the spring 18 is, as before, hooked to the cup portion 20.

What I claim is:

1. An automobile body closure hinge adapted to support the lid of an automobile body compartment and comprising a mounting plate adapted to be secured to a vertical panel of an automobile body compartment, a pivot element secured to said mounting plate, a spring-retaining and supporting cup pivotally mounted upon said pivot element and having an approximately cylindrical peripheral portion with a spring-retaining edge flange thereon, a hinge lever arm portion extending from said edge flange and having a lid-mounting portion thereon, and a helical torsion spring encircling said cylindrical peripheral portion in contacting engagement therewith and in abutting engagement with said edge flange, said spring being anchored at one end to said mounting plate and connected at its other end to said spring-retaining cup.

2. An automobile body closure hinge, according to claim 1, wherein said mounting plate has a cupped recess and wherein said pivot element, said spring retaining cup and said torsion spring are disposed at least partially in said recess.

3. An automobile body closure hinge, according to claim 1, wherein said lid-mounting portion in the closed position of the hinge is disposed remote from said pivot element in an approximately horizontal direction.

4. An automobile body closure hinge, according to claim 1, wherein said lid-mounting portion in the closed position of the hinge is disposed approximately above said pivot element.

References Cited in the file of this patent

UNITED STATES PATENTS

| | | |
|---|---|---|
| 2,200,511 | Ludwig | May 14, 1940 |
| 2,560,181 | Morvice | July 10, 1951 |